(12) United States Patent
Huang

(10) Patent No.: US 11,897,674 B2
(45) Date of Patent: Feb. 13, 2024

(54) PUSH-BUTTON LOCKING CUP LID AND THERMOS CUP

(71) Applicant: Guangzhou Hocomaid Houseware Development Co., Ltd., Guangdong (CN)

(72) Inventor: Wei Huang, Guangdong (CN)

(*) Notice: Subject to any disclaimer, the term of this patent is extended or adjusted under 35 U.S.C. 154(b) by 0 days.

(21) Appl. No.: 17/838,260

(22) Filed: Jun. 13, 2022

(65) Prior Publication Data

US 2023/0002130 A1 Jan. 5, 2023

(30) Foreign Application Priority Data

Jul. 2, 2021 (CN) .......................... 202121493787.1

(51) Int. Cl.
| | |
|---|---|
| *A45F 3/18* | (2006.01) |
| *B65D 47/28* | (2006.01) |
| *B65D 47/32* | (2006.01) |
| *A47J 41/00* | (2006.01) |
| *A47G 19/22* | (2006.01) |
| *B65D 55/12* | (2006.01) |
| *B65D 51/16* | (2006.01) |

(52) U.S. Cl.
CPC .......... *B65D 51/1672* (2013.01); *A45F 3/18* (2013.01); *A47G 19/2272* (2013.01); *A47J 41/0022* (2013.01); *B65D 47/28* (2013.01); *B65D 47/32* (2013.01); *B65D 55/12* (2013.01); *B65D 2205/02* (2013.01); *B65D 2255/20* (2013.01)

(58) Field of Classification Search
CPC ........... B65D 51/1672; B65D 51/1688; B65D 47/28; B65D 27/32; B65D 2205/02; B65D 51/1683; B65D 55/02; B65D 55/12; A47J 41/0027; A47J 41/0022; A45F 3/18; A47G 19/2272
See application file for complete search history.

(56) References Cited

U.S. PATENT DOCUMENTS

| | | | | |
|---|---|---|---|---|
| 7,546,933 | B2* | 6/2009 | Pinelli .................... | B65D 51/18 220/714 |
| 8,622,229 | B2* | 1/2014 | Lane ...................... | B65D 43/26 215/388 |
| 9,462,904 | B2* | 10/2016 | Coon ................. | B65D 51/1672 |
| 9,873,554 | B2* | 1/2018 | Choltco-Devlin ..... | B65D 51/18 |
| 9,908,687 | B2* | 3/2018 | Chiou ....................... | A45F 3/16 |

(Continued)

FOREIGN PATENT DOCUMENTS

CN 20436311 * 6/2015

*Primary Examiner* — John K Fristoe, Jr.
*Assistant Examiner* — Jennifer Castriotta

(57) ABSTRACT

A push-button locking cup lid and thermos cup, including a top lid provided with a water outlet, an inner plug provided with a steam outlet, and a double sealing valve structure mounted inside the top lid, which includes a button rod, a front spring, a rear spring, a spring mounting box fixed to the top lid, a water outlet valve rod and a steam outlet valve rod respectively configured to open or close the water outlet and the steam outlet, and respectively provided with a water sealing silicone and a steam sealing silicone; a middle part and an upper end of the button rod are respectively articulated with the top lid and the steam outlet valve rod; a slider switch is provided on a side wall of the top lid corresponding to the button rod; a blocker is provided on the slider switch to block the steam outlet valve rod.

5 Claims, 7 Drawing Sheets

(56) References Cited

U.S. PATENT DOCUMENTS

| | | | |
|---|---|---|---|
| 11,312,547 B2* | 4/2022 | Siegenthaler | B65D 43/26 |
| 11,358,761 B2* | 6/2022 | Huang | A45F 3/16 |
| 2014/0197170 A1* | 7/2014 | Carlile | B65D 47/249 |
| | | | 220/262 |
| 2015/0201776 A1* | 7/2015 | Elsaden | A47G 19/2272 |
| | | | 220/715 |

* cited by examiner

Closing the Steam Outlet Valve Rod

Opening the Steam Outlet Valve Rod

Water Flow

PUSH-BUTTON LOCKING CUP LID AND THERMOS CUP

BACKGROUND OF THE INVENTION

The present utility model relates to the field of daily appliances, and more particularly a push-button locking cup lid with double sealing valve structure, and a thermos cup.

Currently, the thermos cup in the prior art comprises a cup body and a lid arranged on an opening part of the cup body; this kind of lid is usually provided with a water outlet valve on its top part. When the water outlet valve is opened, both steam and water are discharged from the water outlet valve, and thus often cause injury to users due to the discharge of steam, while it is also inconvenient to operate. Therefore, a Chinese utility model CN204363611U (application no. 201420871559.7) has disclosed a cup lid with double sealing valves, and a thermos cup, wherein a water outlet valve and a steam outlet valve operate asynchronously, so that steam and water can be discharged at separate times and directions, thereby avoiding injury to users caused by the discharge of high temperature steam; however, as the valves can be opened by pressing a button, users may be burnt accidentally when the button is pressed by mistake. Therefore, this kind of thermos cup is not suitable for carrying in a handbag.

BRIEF SUMMARY OF THE INVENTION

It is an object of the present utility model to provide a push-button locking cup lid, and a thermos cup, which can avoid accidental discharges of steam or water caused by unintended presses against a button rod.

To attain the above object, the present utility model provides the following technical solutions: A push-button locking cup lid, comprising a top lid, an inner plug, and a double sealing valve structure mounted inside the top lid; a water outlet and a steam outlet are provided respectively on the top lid and the inner plug; wherein the double sealing valve structure comprises a button rod, a water outlet valve rod configured to open or close the water outlet, a steam outlet valve rod configured to open or close the steam outlet, a front spring, a rear spring, and a spring mounting box fixedly connected to the top lid; a first end of the water outlet valve rod is provided with an axial hole; two symmetrical holes are provided on a wall of the axial hole; a first end of the steam outlet valve rod is inserted into the axial hole; a position limiting pin is connected to the first end of the steam outlet valve rod; two ends of the position limiting pin pass through the two holes respectively; two ends of the front spring are fixedly connected to an inner front side wall of the spring mounting box and the position limiting pin respectively; two ends of the rear spring are fixedly connected to an inner rear side wall of the spring mounting box and the position limiting pin respectively; a water sealing silicone and a steam sealing silicone are provided on the water outlet valve rod and the steam outlet valve rod respectively; a middle part of the button rod is articulated to the top lid, and an upper end part of the button rod is articulated to a second end of the steam outlet valve rod; a side wall of the top lid which aligns with the button rod is provided with a slider switch which is capable of being moved up and down; a blocker is provided on the slider switch to block the second end of the steam outlet valve rod.

Further, the top lid comprises a lid body and a side lid connected to the lid body; a vertical groove is provided on the side lid; the slider switch is slidably mounted in the vertical groove.

Further, a dust-proof inner lid is detachably arranged on the inner plug, and a rubber cushion is provided between the inner plug and the dust-proof inner lid.

The present utility model further discloses a thermos cup, comprising a cup body and the push-button locking cup lid discussed above; the cup body and the push-button locking cup lid are in threaded connection.

The beneficial effects of the present utility model include: as the double sealing valve structure and the slider switch are provided, the slider switch is configured to lock the button rod, so that the double sealing valve structure is in a locked status, which will not lead to leakage of liquid from the cup body by accidentally pressing the button rod under any circumstances, thereby enhancing customers' experience. Meanwhile, as the steam outlet valve rod and the water outlet valve rod are driven to move asynchronously, during a single pressing progress, the steam is first discharged, and then the water, so as to prevent injury to consumers caused by the discharge of high temperature steam, thereby ensuring consumers' safety.

DETAILED DESCRIPTION OF THE INVENTION

Figure 1:
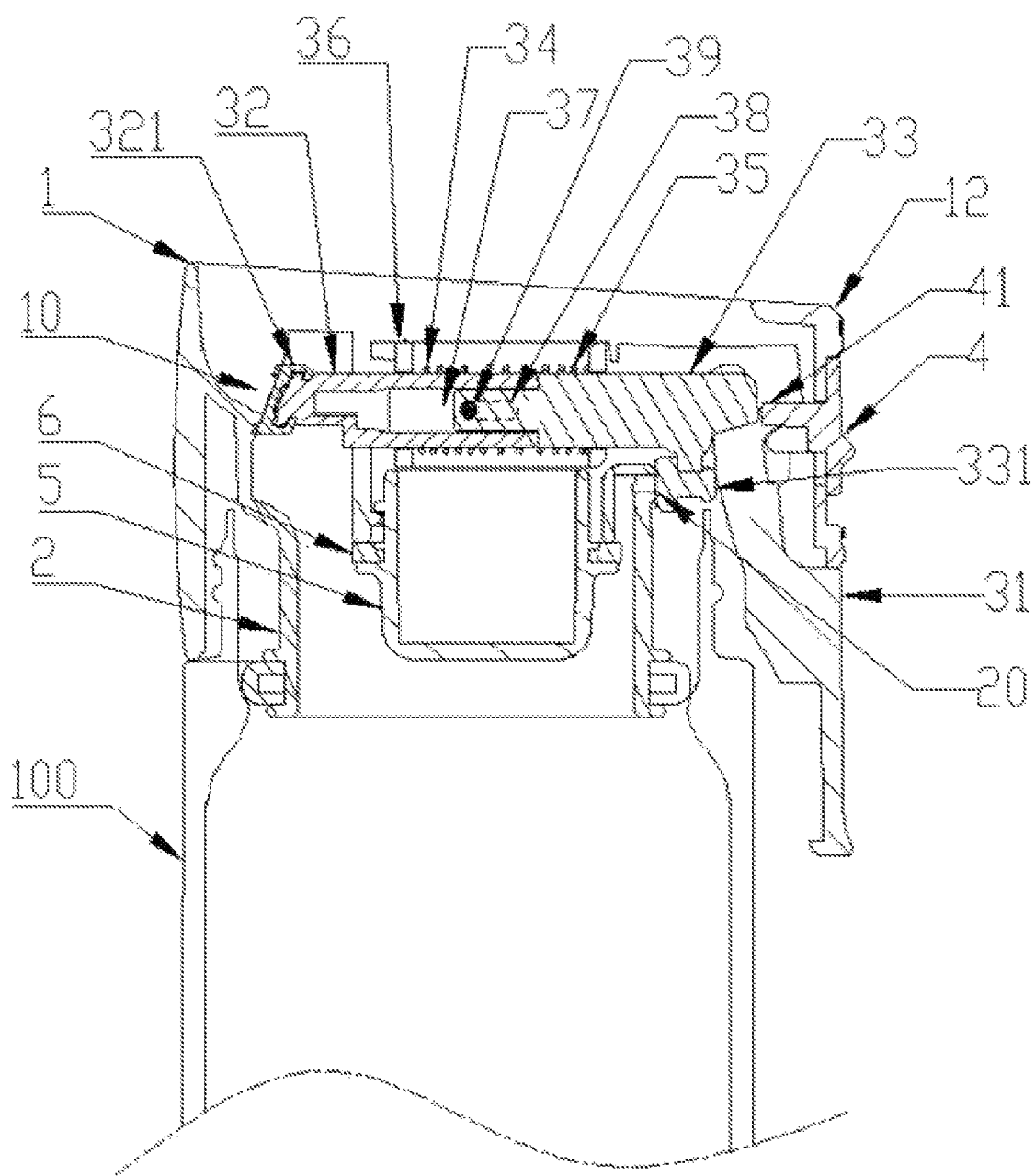
FIG. 1 shows a sectional view of the cup lid of the present utility model connected to the cup body.

For those of ordinary skill in the art to better understand the technical solutions of the present utility model, the following will describe in detail the present utility model with reference to the accompanying drawings and embodiments. It is noted that the embodiments in the present application and the features in the embodiments can be combined with each other, provided that they are compatible.

As illustrated in FIGS. 1-4, the present utility model provides a push-button locking cup lid, comprising a top lid 1, an inner plug 2, and a double sealing valve structure mounted inside the top lid 1; a water outlet 10 and a steam outlet 20 are provided respectively on the top lid 1 and the inner plug 2.

The double sealing valve structure comprises a button rod 31, a water outlet valve rod 32 configured to open or close the water outlet 10, a steam outlet valve rod 33 configured to open or close the steam outlet 20, a front spring 34, a rear spring 35 and a spring mounting box 36. The spring mounting box 36 and the top lid 1 are fixedly connected to each other by high frequency welding.

A first end of the water outlet valve rod 32 is provided with an axial hole 37, and its second end is configured to block the water outlet 10; two symmetrical holes 38 are provided on a wall of the axial hole 37; a first end of the steam outlet valve rod 33 is inserted into the axial hole 37; a connecting part of the water outlet valve rod 32 and the steam outlet valve rod 33 is positioned inside the spring mounting box 36; a position limiting pin 39 is connected to the first end of the steam outlet valve rod 33; two ends of the position limiting pin 39 pass through the two holes 38 respectively. Two ends of the front spring 34 are fixedly connected to an inner front side wall of the spring mounting box 36 and the position limiting pin 39 respectively; two ends of the rear spring 35 are fixedly connected to an inner rear side wall of the spring mounting box 36 and the position limiting pin 39 respectively. A water sealing silicone 321 and a steam sealing silicone 331 are provided on the water outlet valve rod 32 and the steam outlet valve rod 33 respectively.

A middle part of the button rod 31 is articulated to the top lid 1, and an upper end part of the button rod 31 is articulated to a second end of the steam outlet valve rod 33; a side wall of the top lid 1 which aligns with the button rod 31 is provided with a slider switch 4 which can be moved up and down; a blocker 41 is provided on the slider switch 4 to block the second end of the steam outlet valve rod 33.

Figure 8:
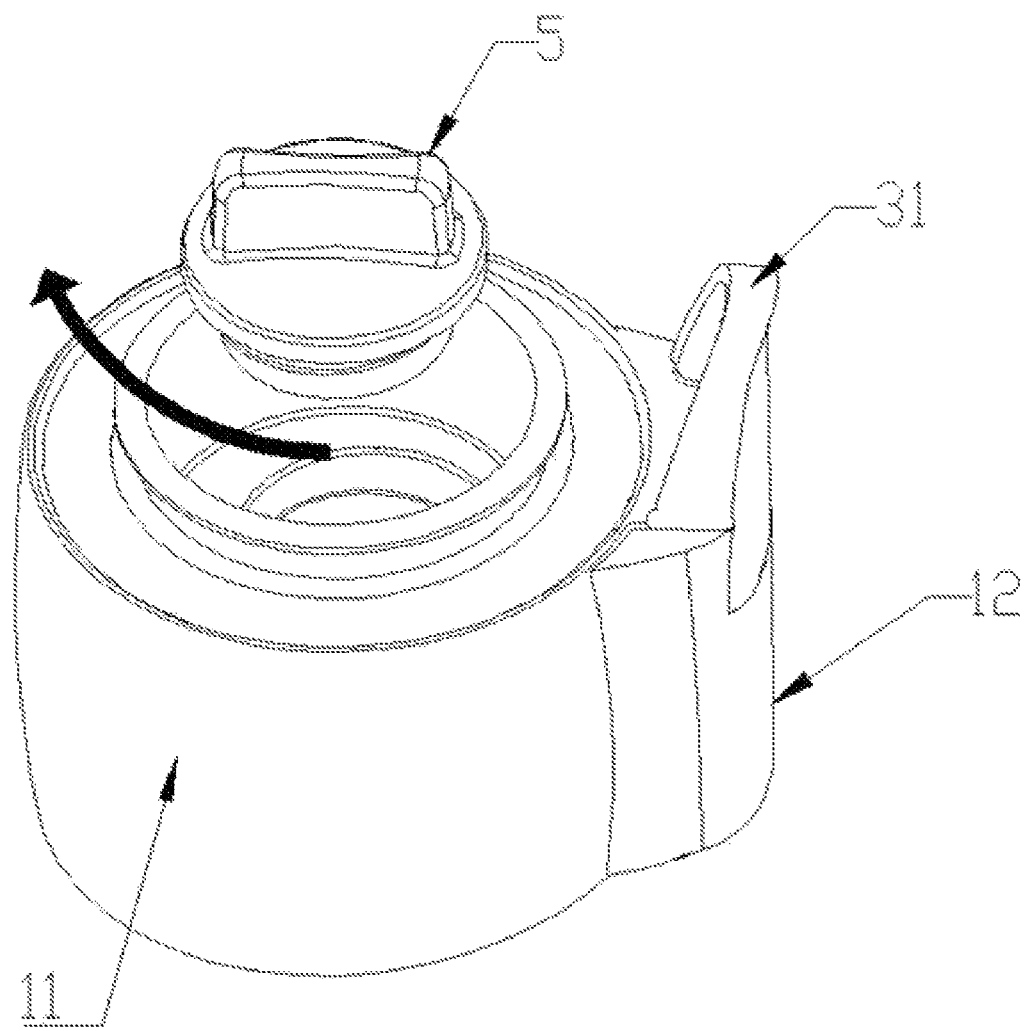
FIG. 8 shows a schematic view of the dust-proof inner lid in a disassembled status.

Specifically, as illustrated in FIGS. 1 and 8, the top lid 1 comprises a lid body 11 and a side lid 12 connected to the lid body 11; a vertical groove is provided on the side lid 12; the slider switch 4 is slidably mounted in the vertical groove, and the slider switch 4 can be moved up and down along the vertical groove.

Furthermore, a dust-proof inner lid 5 is detachably arranged on the inner plug 2, and a rubber cushion 6 is provided between the inner plug 2 and the dust-proof inner lid 5, so that dust can be prevented from entering into the lid body 11 during usage, and an interior part of the lid body can be cleaned during disassembly.

Figure 2:
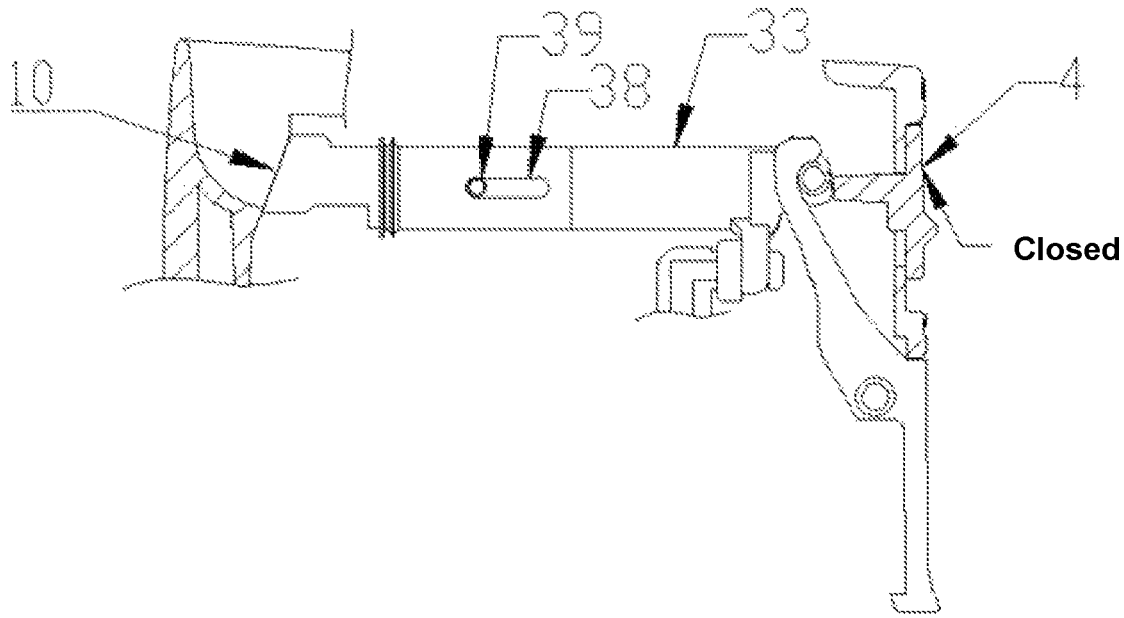
FIG. 2 shows a schematic view of the steam outlet valve rod of the present utility model in a locked status.
Figure 3:
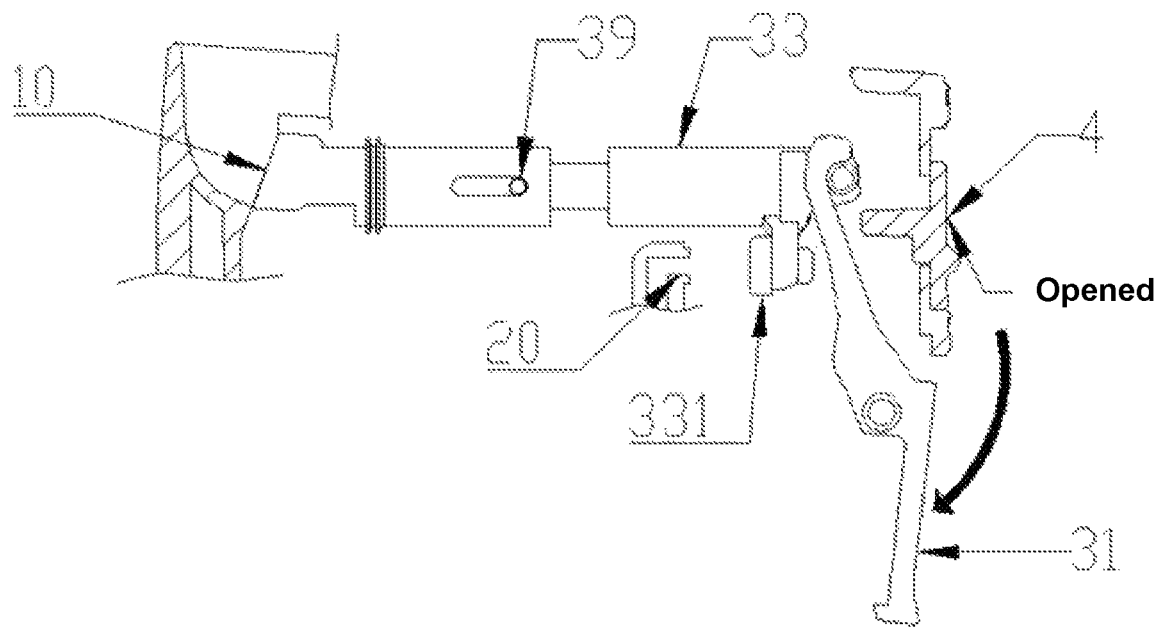
FIG. 3 shows a schematic view of the steam outlet valve rod of the present utility model in an unlocked status to discharge steam.
Figure 4:
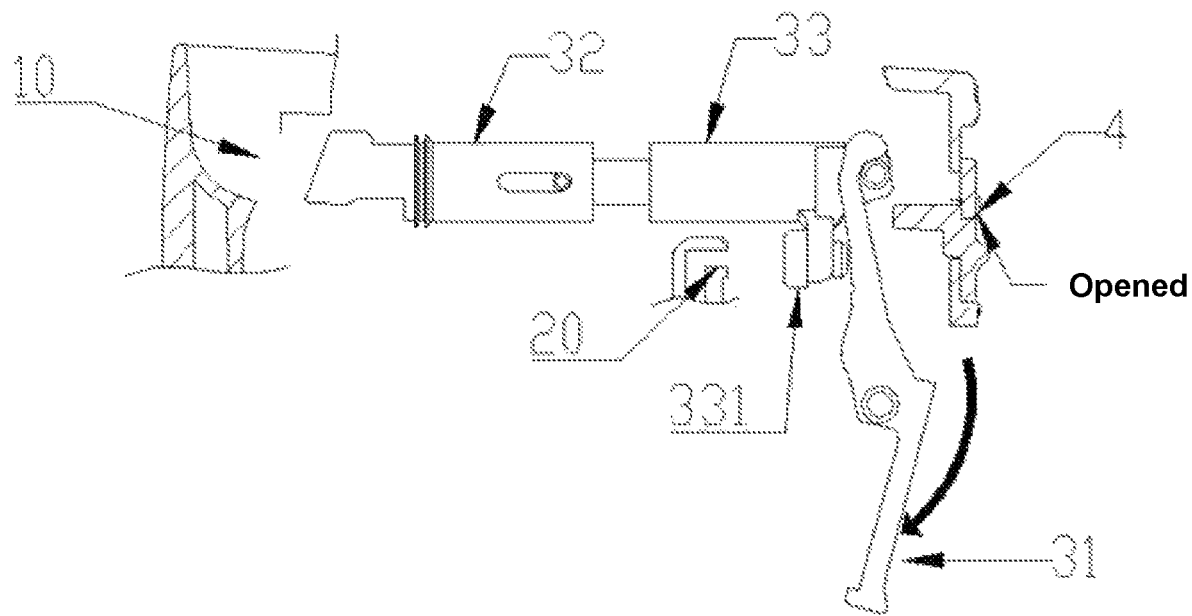
FIG. 4 shows a schematic view of the steam outlet valve rod of the present utility model in an unlocked status to discharge both steam and water.
Figure 5:
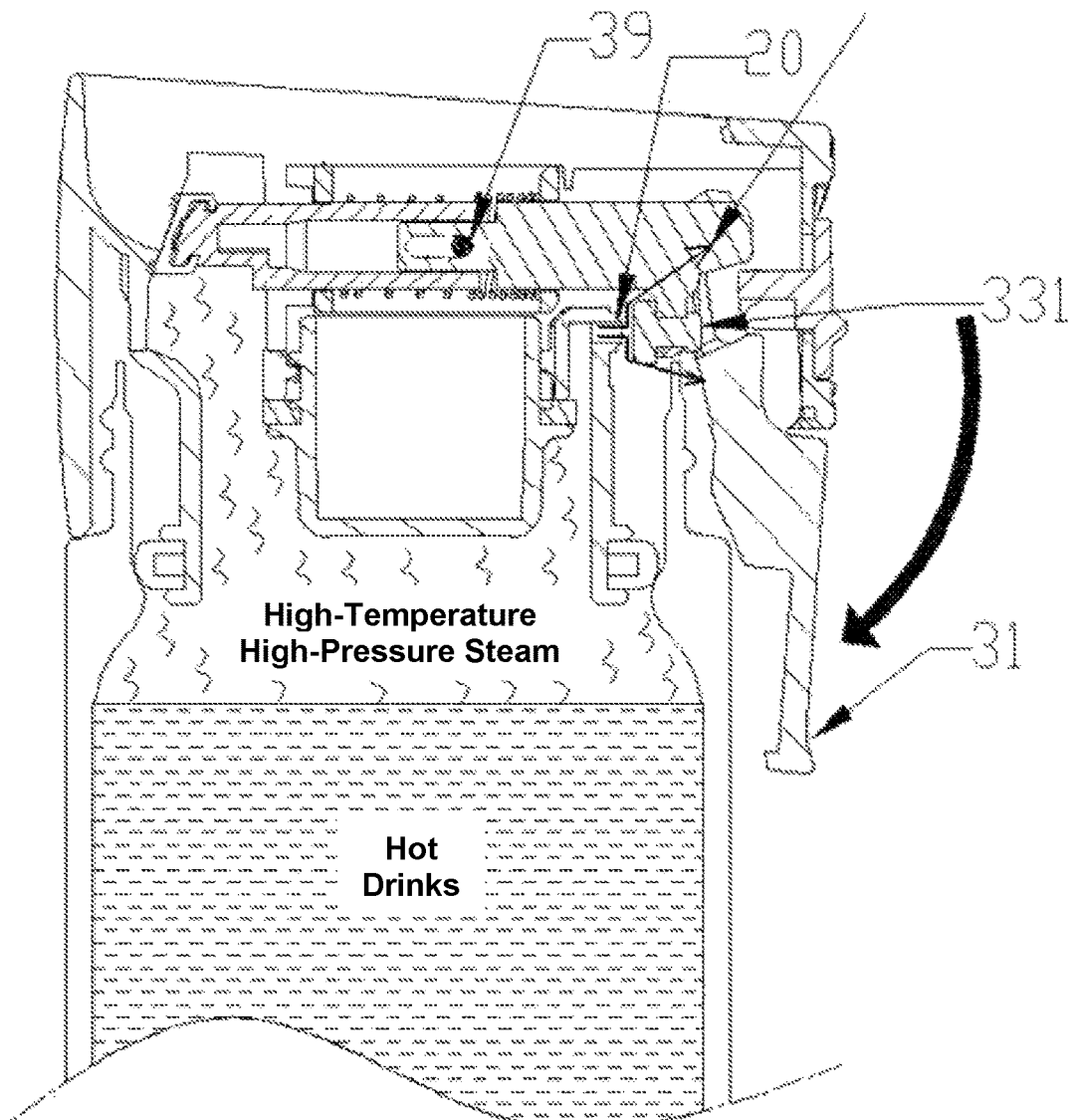
FIG. 5 shows a schematic view of the steam outlet valve rod as in FIG. 1 being moved to open only the steam outlet.
Figure 6:
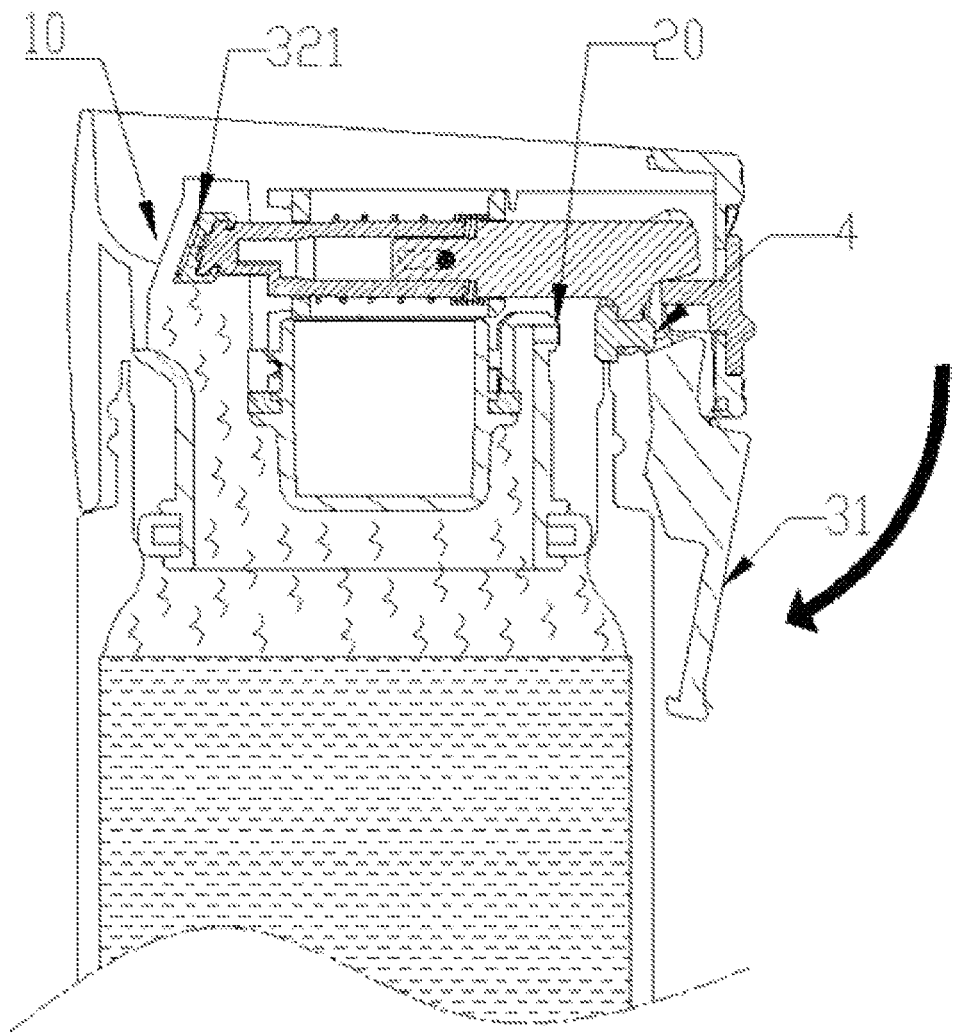
FIG. 6 shows a schematic view of the steam outlet and the water outlet as in FIG. 1 both in an opened status.
Figure 7:
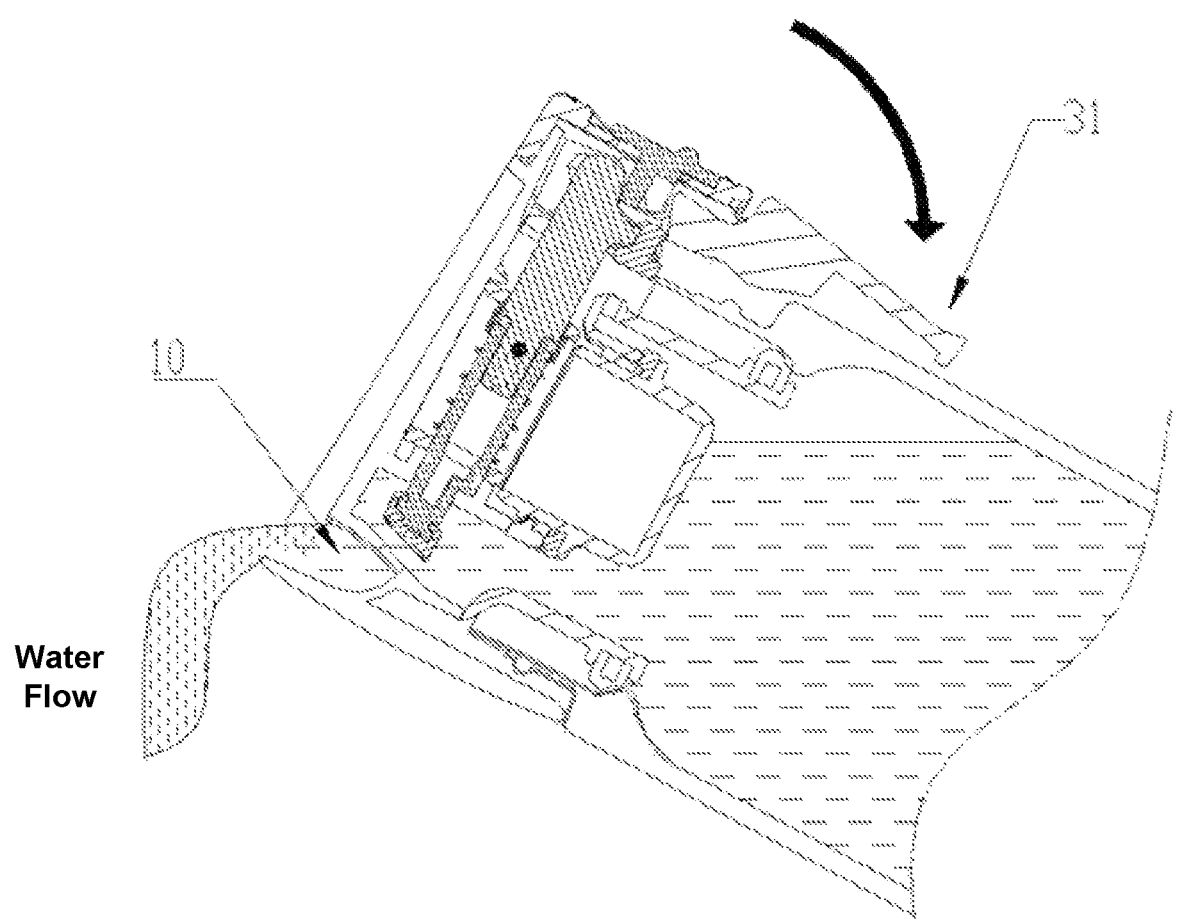
FIG. 7 shows a schematic view of FIG. 6 in a condition of pouring out liquid.

When the push-button locking cup lid of the present utility model is not in use, the slider switch 4 is positioned at a top part of the vertical groove such that the blocker 41 abuts the second end of the steam outlet valve rod 33, so that the button rod 31 cannot be pressed and is thus being locked (as illustrated in FIGS. 1 and 2), thereby avoiding problems caused by unintended presses against the button rod 31. When liquid is needed to be poured out, slide the slider switch 4 to a bottom part of the vertical groove, and separate the blocker 41 from abutting against the second end of the steam outlet valve rod 33, freeing space for the steam outlet valve rod 33 to move, so that the button rod 31 can be pressed and is thus being unlocked. When the button rod 31 is pressed during an unlocked status, it first pulls the steam outlet valve rod 33 to move away from the steam outlet 20 and open the steam outlet 20, so as to discharge the steam (as illustrated in FIGS. 3 and 5); as the button rod 31 continues to be pressed, the steam outlet valve rod 33 continues to be pulled, and when the position limiting pin 39 reaches ends of the holes 38 away from the second end of the water outlet valve rod 32, the water outlet valve rod 32 is also driven to be pulled by the position limiting pin 39 and thus opens the water outlet 10, so as to pour out the liquid inside the cup (as illustrated in FIGS. 4, 6 and 7). By releasing the button rod 31 after pouring out the liquid, under the elastic force of the front spring 34 and the rear spring 35, the water outlet valve rod 32 and the steam outlet valve rod 33 are reset; the button rod 31 then can be locked by sliding the slider switch 4 upward to the top part of the vertical groove.

Besides, as illustrated in FIG. 1, the present utility model further discloses a thermos cup, comprising a cup body 100 and the push-button locking cup lid discussed above; the cup body 100 and the push-button locking cup lid are in threaded connection.

In conclusion, although the present utility model describes in detail the aforementioned preferable embodiments, it should be understood that, modifications and changes made by those skilled in the art may without departing from the essence of the present utility model, shall also fall within the protection scope of the present utility model.

What is claimed is:

1. A push-button locking cup lid, comprising a top lid, an inner plug, and a double sealing valve structure mounted inside the top lid; a water outlet and a steam outlet are provided respectively on the top lid and the inner plug; wherein the double sealing valve structure comprises a button rod, a water outlet valve rod configured to open or close the water outlet, a steam outlet valve rod configured to open or close the steam outlet, a front spring, a rear spring, and a spring mounting box fixedly connected to the top lid; a first end of the water outlet valve rod is provided with an axial hole; two symmetrical holes are provided on a wall of the axial hole; a first end of the steam outlet valve rod is inserted into the axial hole; a position limiting pin is connected to the first end of the steam outlet valve rod; two ends of the position limiting pin pass through the two holes respectively; two ends of the front spring are fixedly connected to an inner front side wall of the spring mounting box and the position limiting pin respectively; two ends of the rear spring are fixedly connected to an inner rear side wall of the spring mounting box and the position limiting pin respectively; a water sealing silicone and a steam sealing silicone are provided on the water outlet valve rod and the steam outlet valve rod respectively; a middle part of the button rod is articulated to the top lid, and an upper end part of the button rod is articulated to a second end of the steam outlet valve rod; a side wall of the top lid which aligns with the button rod is provided with a slider switch which is capable of being moved up and down; a blocker is provided on the slider switch to block the second end of the steam outlet valve rod.

2. The push-button locking cup lid of claim 1, wherein the top lid comprises a lid body and a side lid connected to the lid body; a vertical groove is provided on the side lid; the slider switch is slidably mounted in the vertical groove.

3. The push-button locking cup lid of claim 1, wherein a dust-proof inner lid is detachably arranged on the inner plug.

4. The push-button locking cup lid of claim 3, wherein a rubber cushion is provided between the inner plug and the dust-proof inner lid.

5. A thermos cup, comprising a cup body and the push-button locking cup lid of any one of claims 1-4; wherein the cup body and the push-button locking cup lid are in threaded connection.

* * * * *